United States Patent
Lee et al.

(10) Patent No.: US 9,397,778 B2
(45) Date of Patent: Jul. 19, 2016

(54) TUNABLE OPTICAL NETWORK UNIT FOR MULTI-WAVELENGTH PASSIVE OPTICAL NETWORK SYSTEM AND OPERATING METHOD THEREOF

(71) Applicant: ELECTRONICS AND TELECOMMUNICATIONS RESEARCH INSTITUTE, Daejeon-si (KR)

(72) Inventors: Jie Hyun Lee, Daejeon-si (KR); Heuk Park, Daejeon-si (KR); Jyung Chan Lee, Daejeon-si (KR); Sang Soo Lee, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/694,224

(22) Filed: Apr. 23, 2015

(65) Prior Publication Data
US 2016/0020868 A1    Jan. 21, 2016

(30) Foreign Application Priority Data

Apr. 23, 2014   (KR) .................. 10-2014-0048914
Apr. 22, 2015   (KR) .................. 10-2015-0056500

(51) Int. Cl.
*H04B 10/00*    (2013.01)
*H04J 14/02*    (2006.01)
*H04J 14/00*    (2006.01)

(52) U.S. Cl.
CPC .................................. *H04J 14/0278* (2013.01)

(58) Field of Classification Search
CPC ............... H04B 10/272; H04J 14/0242; H04J 14/0249; H04J 14/025
See application file for complete search history.

(56) References Cited

U.S. PATENT DOCUMENTS

| 6,847,663 B2 | 1/2005 | Yoon |
| 2005/0046868 A1 | 3/2005 | Kim et al. |

(Continued)

FOREIGN PATENT DOCUMENTS

| KR | 20030073325 A | 9/2003 |
| KR | 100910940 B1 | 7/2009 |
| KR | 101179204 B1 | 8/2012 |

OTHER PUBLICATIONS

Ning Cheng, et al; "Automatic ONU Wavelength Control in TWDM PONs", Published in Optical Fiber Communications Conference and Exhibition (OFC), Mar. 9-13, 2014; pp. 1-3.

(Continued)

*Primary Examiner* — Daniel Dobson
(74) *Attorney, Agent, or Firm* — Ladas & Parry LLP (57) ABSTRACT

A tunable optical network unit (ONU) for a multi-wavelength passive optical network (MW PON) system and an operation method thereof are provided. The tunable ONU includes a cyclic tunable filter configured to have cyclic wavelength transmission properties that allow all wavelength channels of both a downstream signal and an upstream signal and to vary a wavelength to pass therethrough; a wavelength splitter configured to split an upstream signal wavelength band and a downstream signal wavelength band; a photodetector element configured to detect a downstream signal that is transmitted through the wavelength splitter, passing through the cyclic tunable filter which is aligned to a specific downstream signal wavelength channel; and a tunable transmitter configured to output to the wavelength transmitter an upstream signal of a wavelength channel that is determined based on an aligned downstream signal wavelength channel of the cyclic tunable filter.

9 Claims, 6 Drawing Sheets

(56) References Cited

U.S. PATENT DOCUMENTS

2006/0133824 A1    6/2006  Myong et al.
2015/0030324 A1*   1/2015  Chang .................... H04J 14/08
                                                          398/35
2015/0372758 A1*  12/2015  Mun ...................... H04B 10/40
                                                         398/135

OTHER PUBLICATIONS

Editor G.989.3; "Draft new Recommendation ITU-T G.989.3 (for Consent, Dec. 5, 2014)", International Telecommunication Union, Telecommunication Standardization Sector Study Period 2013-2015; Study Group 15, TD 289(PLEN/15) Nov. 24-Dec. 5, 2014; 189 pages.

S. Pachnicke, et al; "Investigation of Wavelength Control Methods for Next Generation Passive Optical Access Networks", European Conference and Exhibition on Optical Communication, Sep. 16-20, 2012; pp. 1-3.

S.H. Lee, et al; "Athermal Colourless C-band Optical Transmitter for Passive Optical Networks", Published in: Optical Communication (ECOC), 2010 36th European Conference and Exhibition on; Sep. 19-23, 2010; pp. 1-3.

* cited by examiner

TUNABLE OPTICAL NETWORK UNIT FOR MULTI-WAVELENGTH PASSIVE OPTICAL NETWORK SYSTEM AND OPERATING METHOD THEREOF

CROSS-REFERENCE TO RELATED APPLICATION(S)

This application claims the benefit under 35 U.S.C. §119 (a) of Korean Patent Application Nos. 10-2014-0048914, filed on Apr. 23, 2014, and 10-2015-0056500, filed on Apr. 22, 2015, in the Korean Intellectual Property Office, the entire disclosures of which are incorporated herein by references for all purposes.

BACKGROUND

1. Field

The present invention relates to a passive optical network (PON), and more particularly, to an optical network unit (ONU) for a multi-wavelength passive optical network (MW PON) and an operating method thereof.

2. Description of the Related Art

As optical communication technology is advanced and the demand for the Internet service increases rapidly, fundamental research on an optical access network has been conducted since the early 2000s, and thus introduction of a broadband convergence network (which directly connects an office or a central office (CO) to subscribers through an optical fiber) such as fiber to the home (FTTH) and fiber to the office (FITO) is generalized. Herewith, research on next generation super high-speed large-scale optical access network technology is being actively done for responding to an explosive increase in traffic due to the spread of mobile Internet protocol (IP) terminals such as smartphones or tablet computers, the commercialization of an IP television (IPTV) service, and the spread of a multimedia broadcast/streaming service over the Internet.

As a method for efficiently providing a service to more subscribers with limited network resources, a time division multiplexing (TDM) technique and a wavelength division multiplexing (WDM) technique are being applied to optical access network technology. Recently, research is being conducted on an optical access network using a hybrid technique in which both the TDM technique and the WDM technique are applied. Attempts to apply an orthogonal frequency division multiplexing (OFDM) technique (which is mainly used in wireless communication at present) to the optical access network technology are also being actively made, which is an example of the hybrid technique in a broad sense.

Among the techniques, the WDM technique or the hybrid technique may perform communication using a plurality of wavelength bands, namely, a multi-wavelength. As the use of the Internet increases and demand for multimedia contents increases explosively, increasing a bandwidth of a network in a wired optical access network and a wireless network or a merged wired/wireless network thereof is becoming an increasingly important issue, and particularly, a technique using a multi-wavelength is attracting an attention as a type of method for solving the important issue. According to this, it is possible not only to provide a super high-speed communication service to many subscribers, but also to easily expand a communication capacity and the number of subscribers with an excellent communication security. Therefore, in the next generation super high-speed large-scale optical access network technology, an MW PON using the WDM technique or the hybrid technique is obtaining a great interest.

An MW PON system may include a service provider (hereinafter referred to as "an optical line terminal (OLT)") installed in a CO, a user terminal unit or a number of subscribers (hereinafter referred to as "an optical network unit (ONU)") neighboring thereto, and a local node in which one or more optical multiplexers/de-multiplexers or light intensity splitters are installed or an optical distribution network (hereinafter referred to as "an optical distribution unit (ODN) "). In the MW PON system, a network configuration may be varied depending on the kind of used light source, for example, a spectrum-split light source, a wavelength-locked light source, or a wavelength-independent light source.

In a PON system, such as an MW PON system, one OLT and multiple ONUs exchange signals therebetween, and each ONU transmits an upstream signal thereof using resources allocated by the OLT. For example, in a TWDM PON system, each ONU is required to transmit an upstream signal using a specific wavelength at a designated time, wherein the wavelength and the time are allocated by the OLT, and in the MW PON system, so each ONU is required to transmit an upstream signal using a wavelength allocated at least by an OLT.

The use of a tunable transceiver has been actively considered as an ONU for the TWDM PON system or the MW PON system, in order to utilize a light intensity distributor-based ODN that has been used in the existing TDM PON and also to flexibly allocate wavelength resources. However, if the tunable transceiver fails to stably transmit an upstream signal over an allocated wavelength channel, the upstream signal may be directed to an undesirable OLT, that is, an OLT using a different wavelength, which may result in loss of upstream data.

To address the above drawback, the PON system detects ONUs that are likely to transmit upstream signals using unallocated wavelength channels and/or unallocated time slots, and then the PON system prevents the detected ONUs from transmitting upstream signals or separates them from the system. As another alternative, a research to develop a technology for a wavelength of an output signal from a tunable transmitter to remain stable is ongoing.

One proposed alternative method is to control an output wavelength while transmitting and receiving a calibration message with an OLT (S. Pachnick, et. al., "Investigation of wavelength control methods for next generation passive optical access networks," ECOC2012, P6.02), in which an OLT receives an upstream signal transmitted from an ONU and uses a separate channel, such as a frequency or an out-of-band, in order to tune the upstream signal to a maximum value. However, according to this method, a system, such as a TWDM PON system, which also uses a time and wavelength division multiplexing mechanism, may not be able to detect a momentary drift of an output wavelength of a tunable transmitter.

As the second alternative method, an ONU autonomously aligns an output wavelength (Ning Cheng, et. al., "Automatic ONU wavelength control in TWDM-PONs," OFC 2014 W1D.4). Specifically, a tunable transmitter of the ONU outputs a signal through a very low frequency band, and the ONU detects the degree of alignment of the wavelength and re-calibrate the wavelength based on an amount of reflected signal. However, in this method, a resolution may be degraded due to frequency band isolation in a wavelength band splitter.

The third alternative method is to use a wavelength locking device (S. Pachnick, et. al., "Investigation of wavelength control methods for next generation passive optical access networks," ECOC2012, P6.02). According to this method, a centralized wavelength locker, which is costly, is placed at an OLT and stabilizes wavelengths of output signals from multiple tunable transceivers arranged at an ONU. However, feedback regarding the degree of alignment of the wavelength may be required to be provided from the OLT to the ONU, and this method may not be able to detect a momentary drift of a wavelength, which is also a drawback of the first method.

The fourth alternative method is to use a lookup table that has been precisely set (S. H. Lee, et. al., "Athermal Colourless C-band Optical Transmitter for Passive Optical Networks," ECOC2010, Mo1.B.2). According to this method, however, since there are many variables need to be considered, such as ambient temperature, aging of laser, and hysteresis, which incur high cost to build up the precise lookup table and thus may cause an increase in price of a tunable transceiver.

SUMMARY

One objective of the present disclosure is to provide a tunable optical network unit (ONU) which allows a wavelength alignment of an upstream signal in a multi-wavelength passive optical network (MW PON) system, and an operation method thereof.

Another objective of the present invention is to provide a tunable ONU which is capable of reducing upstream signal wavelength alignment time, and an operating method thereof.

According to one exemplary embodiment of the present disclosure to achieve the above objectives, the tunable ONU is an ONU that is included in the MW PON system. The tunable ONU includes: a cyclic tunable filter configured to have cyclic wavelength transmission properties that allow all wavelength channels of both a downstream signal and an upstream signal and to vary a wavelength to pass therethrough; a wavelength splitter configured to split an upstream signal wavelength band and a downstream signal wavelength band; a photodetector element configured to detect a downstream signal that is transmitted through the wavelength splitter, passing through the cyclic tunable filter which is aligned to a specific downstream signal wavelength channel; and a tunable transmitter configured to output to the wavelength transmitter an upstream signal of a wavelength channel that is determined based on an aligned downstream signal wavelength channel of the cyclic tunable filter.

In one aspect of the exemplary embodiment, the cyclic tunable filter may be a Fabry-Perot Etalon filter that is made of a material that varies its transmission properties according to temperature change or changes in applied voltage.

In another aspect of the exemplary embodiment, the cyclic tunable filter may be a thermal arrayed waveguide grating (AWG). Preferably, the thermal AWG may be made of silicon.

In yet another aspect of the exemplary embodiment, the tunable ONU may further include an upstream signal monitoring component configured to monitor a wavelength of an upstream signal output through the cyclic tunable filter. In this case, the upstream signal monitoring component may include a tap filter to branch off a part of the upstream signal that has passed through the cyclic tunable filter and a monitoring photodiode to detect an upstream signal branched by the tap filter.

According to another exemplary embodiment of the present disclosure to achieve the above objectives, there is provided an operating method of a tunable ONU in an MW PON system, the operating method including: receiving a downstream signal by aligning a cyclic tunable filter of the tunable ONU to a specific downstream signal wavelength channel; setting an output wavelength of a tunable transmitter of the tunable ONU based on an aligned downstream signal wavelength channel of the cyclic tunable filter; and transmitting an upstream signal using the set output wavelength through the tunable transmitter.

In one aspect of the exemplary embodiment, the operating method may be applied to operations of the tunable ONU to perform activation process in Initial state.

In another aspect of the exemplary embodiment, the operating method may be applied to operations subsequent to an operation in which the tunable ONU under normal operation receives a request to change or calibrate an upstream signal wavelength channel.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A tunable optical network unit and an operating method thereof according to exemplary embodiments described hereinafter are applicable to a multi-wavelength passive optical network (MW PON) system. The MW PON system is not limited to a wavelength division multiplexing passive optical network (WDM PON) system, and may be a hybrid PON system, such as a TWDM PON system or an NG-EPON system, in which both a TDM technique and a WDM technique are applied. An orthogonal frequency division multiplexing (OFDM) technique may be applied as a communication method to the TWDM PON system, but the TWDM PON system may be a different system that does not employ the OFDM technique. In addition, an optical network unit (ONU) of the MW PON system has a tunable transceiver. Such an ONU with a tunable transceiver will be referred to simply as a "tunable ONU" in the description below.

Figure 1:
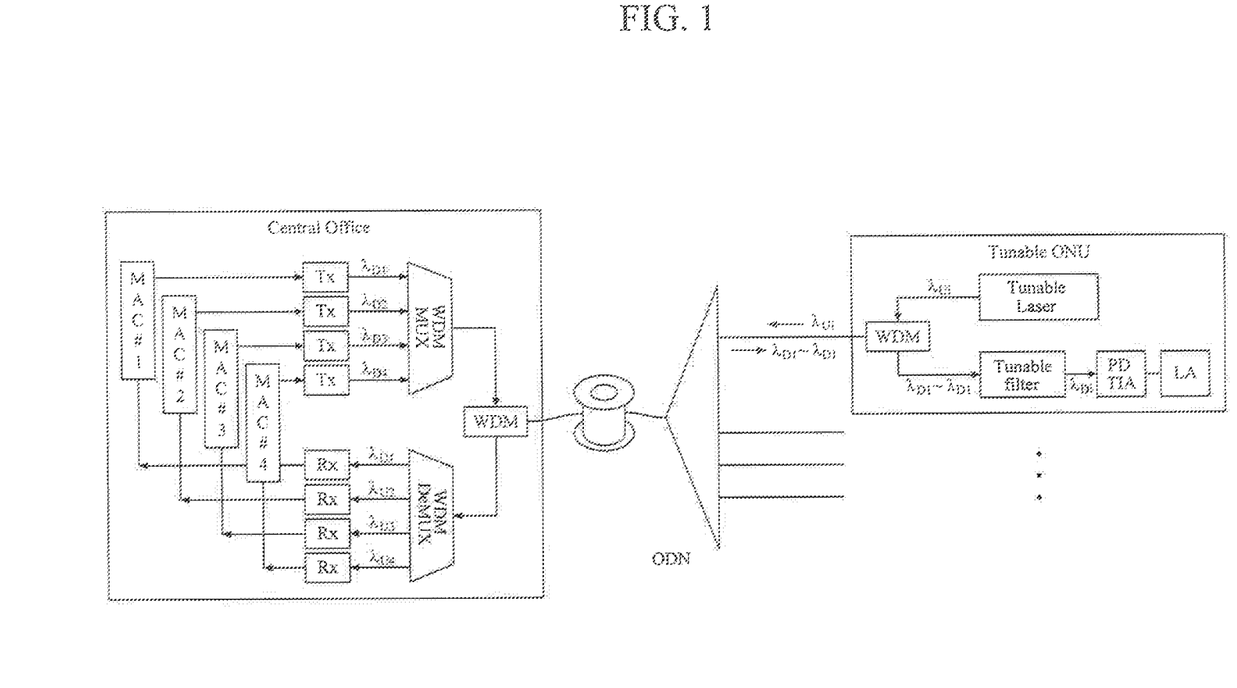
FIG. 1 is a diagram illustrating a configuration of a general multi-wavelength passive optical network (MW PON) system including a tunable optical network unit (ONU).

FIG. 1 is a diagram illustrating a configuration of a general MW PON system having a tunable ONU.

Referring to FIG. 1, the MW PON system includes n (n=4) number of optical line terminals (OLTs) that use different wavelengths at a central office (CO) end, and each OLT is assumed to accommodate one PON link. Each OLT may include a logic module, a transmitter of a particular wavelength, and a receiver of a particular wavelength, and referring to FIG. 1, the four OLTs are each simply represented as a medium access control (MAC), a transmitter Tx and a receiver Rx. In addition, each OLT may have a plurality of ports that use different wavelengths. A wavelength multiplexer WDM MUX, a wavelength demultiplexer WDM DeMUX, and a wavelength splitter WDM for splitting an upstream-signal wavelength band and a downstream-signal wavelength band are placed in front of the OTL.

One optical distribution network (ODN) accommodates n number of TDM PONs, each of which uses an independent wavelength.

The tunable ONU includes a wavelength splitter WDM for splitting an upstream-signal wavelength band and a downstream-signal wavelength band, a tunable light source ("Tunable Laser" in FIG. 1), a tunable filter, a photodetector element (photodiode; PD), a trans-impedance amplifier (TIA), and a limiting amplifier (LA). The tunable ONU uses a particular wavelength (e.g., $\lambda_{d1}$ as a downstream wavelength and $\lambda_{u1}$ as an upstream wavelength) and communicates with a particular OLT (e.g., OLT#1 that includes MAC#1) that uses the same wavelength.

In the MW PON system, an upstream signal is separated in wavelength and then transmitted to corresponding OLTs by the wavelength demultiplexer WDM DeMUX in front of the OLT. In addition, downstream signals from the plurality of OLTs are multiplexed by the wavelength multiplexer WDM MUX, and the multiplexed downstream signal ($\lambda_{d1}$-$\lambda_{d4}$) is transmitted to each tunable ONU. The tunable ONU is able to select only light of a particular wavelength channel $\lambda_{d1}$ from the multiplexed downstream signal ($\lambda_{d1}$-$\lambda_{d4}$) using the tunable receiver, for example, the tunable filter. Then, the tunable ONU transmits an upstream signal by tuning an output light wavelength of the tunable transmitter, for example, the tunable laser, to the specific wavelength $\lambda_{d1}$, in order to transmit the light of the particular wavelength channel that can be received by a corresponding OLT.

The tunable transmitter of the tunable ONU may adjust an output wavelength, which means a wavelength of an output signal. To adjust an output wavelength, the tunable transmitter may be implemented in various forms. For example, the tunable transmitter may be a tunable light source as a single light source whose output wavelength is varied according to control settings, or it may be a tunable light source as an array light source consisting of a plurality of single-wavelength light sources, which changes its output wavelength by outputting light of a particular wavelength according to control settings. Alternatively, the tunable transmitter may be implemented as multiple wavelength light sources that generate outputs of multiple wavelengths, wherein the outputs from light sources exclusive of a light source of a particular wavelength are attenuated so that only the light of the particular wavelength can be finally output according to control settings.

The use of the tunable light source may be advantageous in that it enables the system to be flexibly configured and provides a solution for inventory problems, but the tunable light source may output an undesired wavelength of optical signal which is different from the designated wavelength. There may be several causes of this erroneous output wavelength. For example, an optical signal with a different wavelength that is not a designated wavelength may be output due to aging of the light source, drastic changes in environment (e.g., temperature change), incorrect lookup tables and so on.

In the MW PON system as shown in FIG. 1, the tunable ONU uses a specific wavelength channel (a specific downstream signal wavelength and the corresponding upstream signal wavelength) to communicate with the OLT. In the case of registration of a terminal or moving of a terminal to a different wavelength channel, the tunable ONU may need to set up or change to a new wavelength channel. In addition, even the registered tunable ONU under normal operation may need to check whether an output wavelength of the tunable transmitter is well aligned to the allocated wavelength channel and, when necessary, corrects the wavelength.

Figure 2:
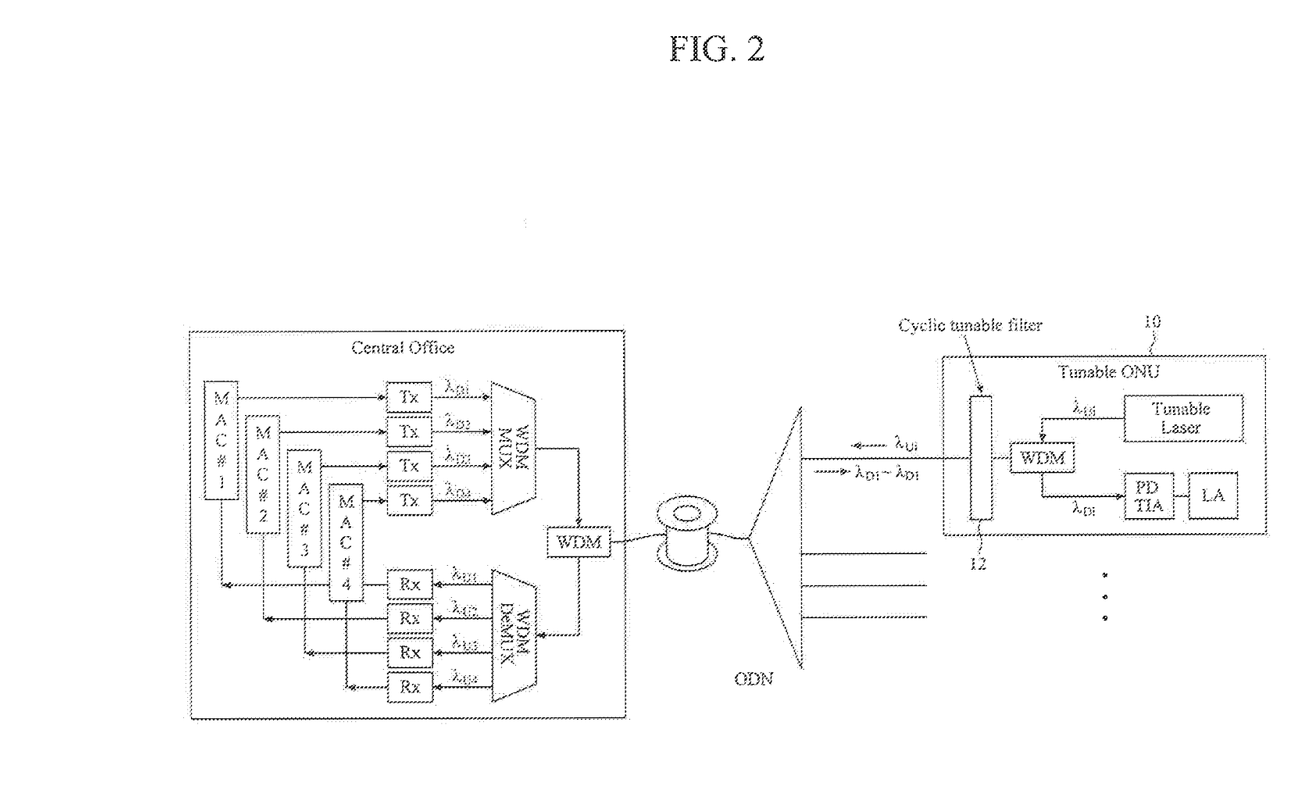
FIG. 2 is a diagram illustrating a configuration of an MW PON system including a tunable ONU according to an exemplary embodiment of the present invention.

FIG. 2 is a diagram illustrating a configuration of an MW PON system including a tunable ONU according to an exemplary embodiment of the present invention. The overall configuration of the MW PON system illustrated in FIG. 2 is almost the same as that of the MW PON system shown in FIG. 1, other than the tunable ONU, whose detailed configuration is different from the tunable ONU of FIG. 1. Therefore, description provided herein will focus on the configuration and operations of the tunable ONU shown in FIG. 2, and the description provided with reference to FIG. 1 may apply to the MW PON system of FIG. 2.

Referring to FIG. 2, the tunable ONU 10 includes a cyclic tunable filter 12, a wavelength splitter WDM, a photodetector element (photodiode; PD), and a tunable transmitter. The cyclic tunable filter has cyclic wavelength transmission properties that allow all wavelength channels of both a downstream signal and an upstream signal to pass through, and the wavelengths of the downstream signal and the upstream signal that are allowed to pass through may vary. The wavelength splitter splits an upstream signal wavelength band and a downstream signal wavelength band. The photodetector element constitutes a receiver of the tunable ONU 10 and detects a downstream signal that is transmitted through the wavelength splitter WDM after passing through the cyclic tunable filter 12 aligned to a specific downstream signal wavelength channel. The tunable transmitter outputs an upstream signal of a specific wavelength channel to the wavelength splitter WDM, wherein the specific wavelength channel of the upstream signal is determined based on the aligned downstream signal wavelength channel of the cyclic tunable filter 12.

As such, the tunable ONU 10 of FIG. 2 is different from the tunable ONU of FIG. 1 in that it includes the cyclic tunable filter 12 that is placed in front of the wavelength splitter WDM that splits an upstream signal wavelength band and a downstream signal wavelength band. The cyclic tunable filter 12 refers to a filter that has cyclic wavelength transmission properties which allow all wavelength channels of both a downstream signal and an upstream signal to pass through. The cyclic tunable filter 12 is cyclically aligned to a wavelength channel of a downstream signal, and thereby it can be automatically aligned to a wavelength channel of an upstream signal that corresponds to the downstream signal. Hence, an upstream signal of an allocated wavelength from the tunable ONU 10 that receives a downstream signal normally is allowed to pass through the cyclic tunable filter 12 and is successfully transmitted to the ODN, but an upstream signal of a unallocated wavelength is filtered out by the cyclic tunable filter 12, before being transmitted to the ODN. That is, the cyclic tunable filter 12 that has been aligned to a wavelength channel of a downstream signal acts as a blocker/aligner with respect to a wavelength channel of an upstream signal.

The cyclic tunable filter 12 may be a Fabry-Perot Etalon filter that is made of a material that varies its transmission properties according to temperature change or changes in applied voltage. Alternatively, the cyclic tunable filter 12 may be a thermal arrayed waveguide grating (AWG). More specifically, a thermal AWG whose optical transmission properties of a specific port vary with temperature may be used as the cyclic tunable filter 12. In this case, an AWG made of silicon may be used as the cyclic tunable filter 12 to improve the thermal characteristic. When using the thermal AWG as the cyclic tunable filter 12, the tunable ONU 10 may not require the wavelength splitter WDM.

In the ONU 10 illustrated in FIG. 2, the cyclic tunable filter 12 serves as a wavelength blocker in the process of transmission of an upstream signal. More specifically, when an output wavelength of the cyclic tunable filter 12 is not aligned to the allocated upstream wavelength channel, the cyclic tunable filter 12 blocks the transmission of an upstream signal to the CO end. That is, an upstream signal of a wavelength that is not aligned to the allocated wavelength (i.e., the wavelength being different from the allocated wavelength) is filtered out by the cyclic tunable filter 12 and thus not output from the tunable ONU 10. Accordingly, the tunable ONU 10 can avoid being a rogue ONU fundamentally.

Unlike the tunable ONU illustrated in FIG. 1, the tunable ONU 10 of FIG. 2 does not have a tunable filter at a rear end of the wavelength splitter WDM. As described above, the tunable filter serving as a tunable receiver selectively allows light of a particular wavelength channel of a multiplexed downstream signal to pass therethrough. The tunable ONU 10, however, does not receive the multiplexed downstream signal, but receives, at its receiving end, a downstream signal of a particular wavelength that has passed through the cyclic tunable filter 12 placed in front of the wavelength splitter WDM. Hence, according to the present exemplary embodiment, the tunable ONU 10 does not need to have a tunable filter installed at the receiving end.

Figure 3:
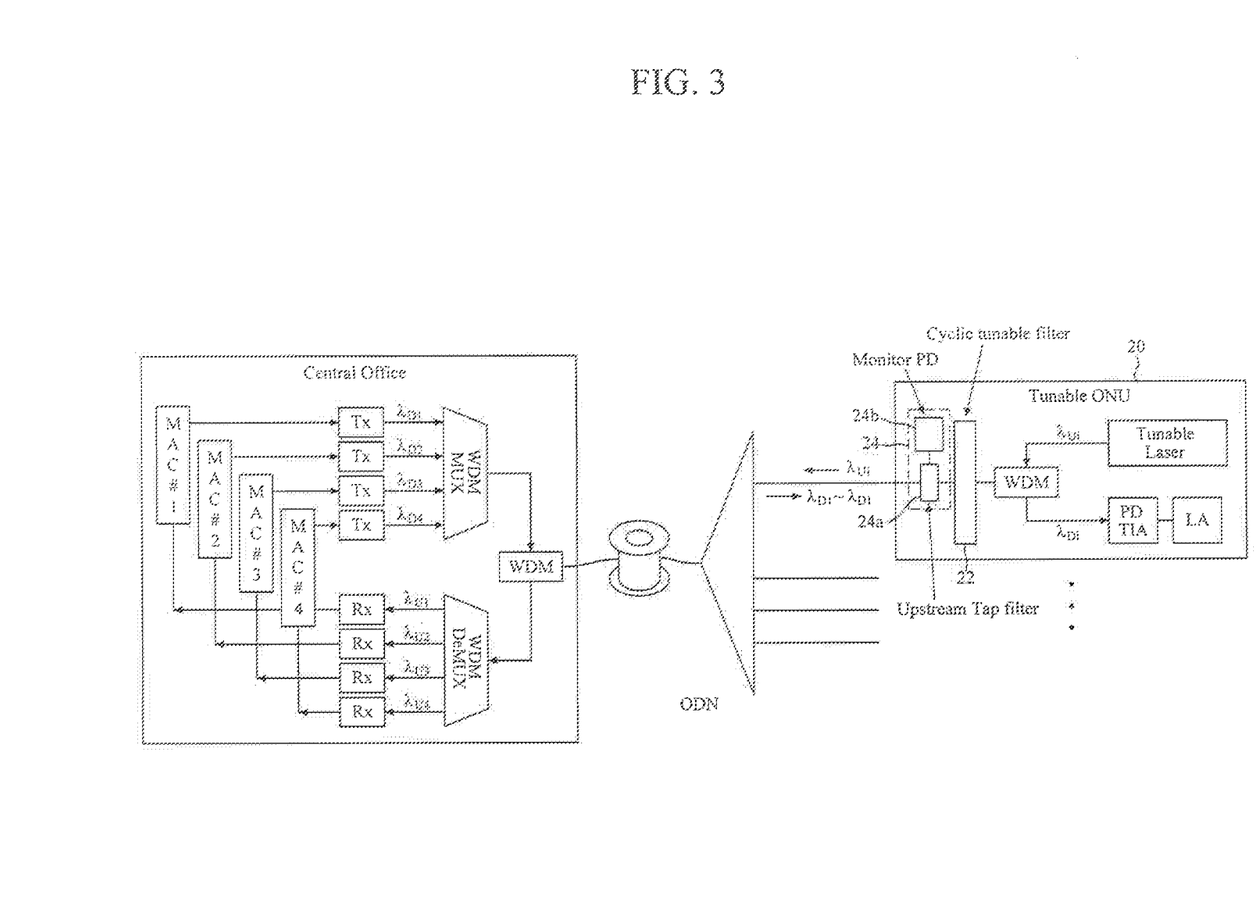
FIG. 3 is a diagram illustrating a configuration of an MW PON system including a tunable ONU according to another exemplary embodiment of the present invention.

FIG. 3 is a diagram illustrating an example of a configuration of an MW PON system including a tunable ONU according to another exemplary embodiment of the present invention. The overall configuration of the MN PON system illustrated in FIG. 3 is almost the same as the MW PON system shown in FIG. 2, other than the tunable ONU, whose detailed configuration is different from the tunable ONU of FIG. 2. Therefore, description provided herein will focus on the configuration and operations of the tunable ONU shown in FIG. 2, and the description provided with reference to FIG. 2 may apply to the MW PON system of FIG. 3.

Referring to FIG. 3, the tunable ONU 20 is similar to the tunable ONU 10 shown in FIG. 2 and includes a cyclic tunable filter 22 in front of a wavelength splitter WDM that splits an upstream signal wavelength band and a downstream signal wavelength band. However, unlike the tunable ONU 10 of FIG. 2, the tunable ONU 20 further includes an upstream signal monitoring component 24. The upstream signal monitoring component 24 is to monitor a wavelength of an upstream signal output through the cyclic tunable filter 22.

The tunable ONU 20 that obtains information about the wavelength of an upstream signal using the upstream signal monitoring component 24 may autonomously update a lookup table and/or provide an OLT with information needed for the OLT to update the lookup table. The lookup table refers to a table that specifies relationships between control variable settings and output wavelengths. More specifically, by using correlation between optical wavelength output properties of the tunable transmitter and light transmission properties of the cyclic tunable filter 22 and/or received information from the OLT, the tunable ONU 20 may cyclically update the lookup table of the tunable transmitter or transmit needed information to the OLT to update the lookup table.

In the present exemplary embodiment, the upstream signal monitoring component 24 is not limited in its configuration as long as it can obtain information about the wavelength information of an upstream signal that passes through the cyclic tunable filter 22. For example, the upstream signal monitoring component 24 may obtain, from the cyclic tunable filter 22 itself, wavelength information of an upstream signal that passes through the cyclic tunable filter 22, or the upstream signal monitoring component 24 may be additionally placed in front of the cyclic tunable filter 22. As an example of the latter case, as shown in FIG. 3, the upstream signal monitoring component 24 may include a tap filter 24a and a monitoring photodiode 24b wherein the tap filter branches off a part of an upstream signal that has passed through the cyclic tunable filter 22 and the monitoring photodiode 24b is used to detect an upstream signal branched by the tap filter 24a.

According to one aspect of the exemplary embodiments described with reference to FIGS. 2 and 3, a wavelength band-pass filter may be additionally provided in front of an optical receiver and operate some of wavelength channels in groups where the wavelength channels are operated by the system. This operating method is effective when a wavelength cycle or free spectral range (FSR) of the cyclic tunable filters 10 and 20 is not long enough compared to the number of wavelength channels operated by the MW PON system. In addition, the wavelength band-pass filter is formed to be wavelength tunable and operated in the form of a comb filter.

According to another aspect of the exemplary embodiments described with reference to FIGS. 2 and 3, an isolator may be further installed in an optical path of the tunable transmitter. The isolator prevents possible performance degradation of the tunable transmitter which may be caused by a part of an output signal being reflected back to the tunable transmitter.

Herein, an operating method of the tunable ONU in the MW PON system according to the exemplary embodiments described above with reference to FIGS. 2 and 3 will be described.

According to the exemplary embodiment, the tunable ONU aligns the cyclic tunable filter to a particular downstream signal wavelength channel and receives a downstream signal. Then, in the case where the tunable ONU is installed in a network for the first time or the synchronization with the downstream signal has not been made for some reasons, the tunable ONU performs the synchronization with the received downstream signal. In the case where the tunable ONU is operating normally, the cyclic tunable filter may already have been aligned to a particular downstream signal wavelength channel and the synchronization with the downstream signal may already have been completed.

In addition, the tunable ONU sets an output wavelength of the tunable transmitter based on the downstream signal wavelength channel to which the cyclic tunable filter is aligned. As described above, the cyclic tunable filter has cyclic wavelength transmission properties. Thus, if the cyclic tunable filter is aligned to a particular downstream signal wavelength channel, information about the upstream signal wavelength channel can be obtained using the wavelength transmission properties of the filter. Alternatively, in other exemplary embodiments, information about the upstream signal wavelength channel can be obtained by monitoring the upstream signal output through the cyclic tunable filter.

The tunable ONU finally transmits the upstream signal using a designated output wavelength through the tunable transmitter.

The operating method according to the above exemplary embodiments may be implemented to adaptively respond to various situations in which the tunable ONU is applied. For example, if the tunable ONU is installed in the network for the first time or receives a request from the OLT to change or calibrate a wavelength, the tunable ONU may operate appropriately in each situation. Hereinafter, the operating method of the tunable ONU in each of the aforesaid situations will be described in detail.

The following exemplary embodiments are described under the assumption that the tunable ONU operates according to 8 ONU activation states which are described in Draft New Recommendation ITU-T G.989.3 (for Consent, 4 Apr. 2014) that is in the process of being standardized by ITU-T Study Group 15. In other words, the description provided in the aforesaid draft may apply to the present disclosure which may omit description of the 8 ONU activation states. The draft is incorporated herein by references for all purposes. The 8 ONU activation states consist of Initial state O1, Profile Learning state O2, Serial_Nnumber state O3, Ranging state O4, Operation state O5, Intermittent LODS (Loss of Downstream) state O6, Emergency Stop state, and Tuning state O8.

Figure 4:
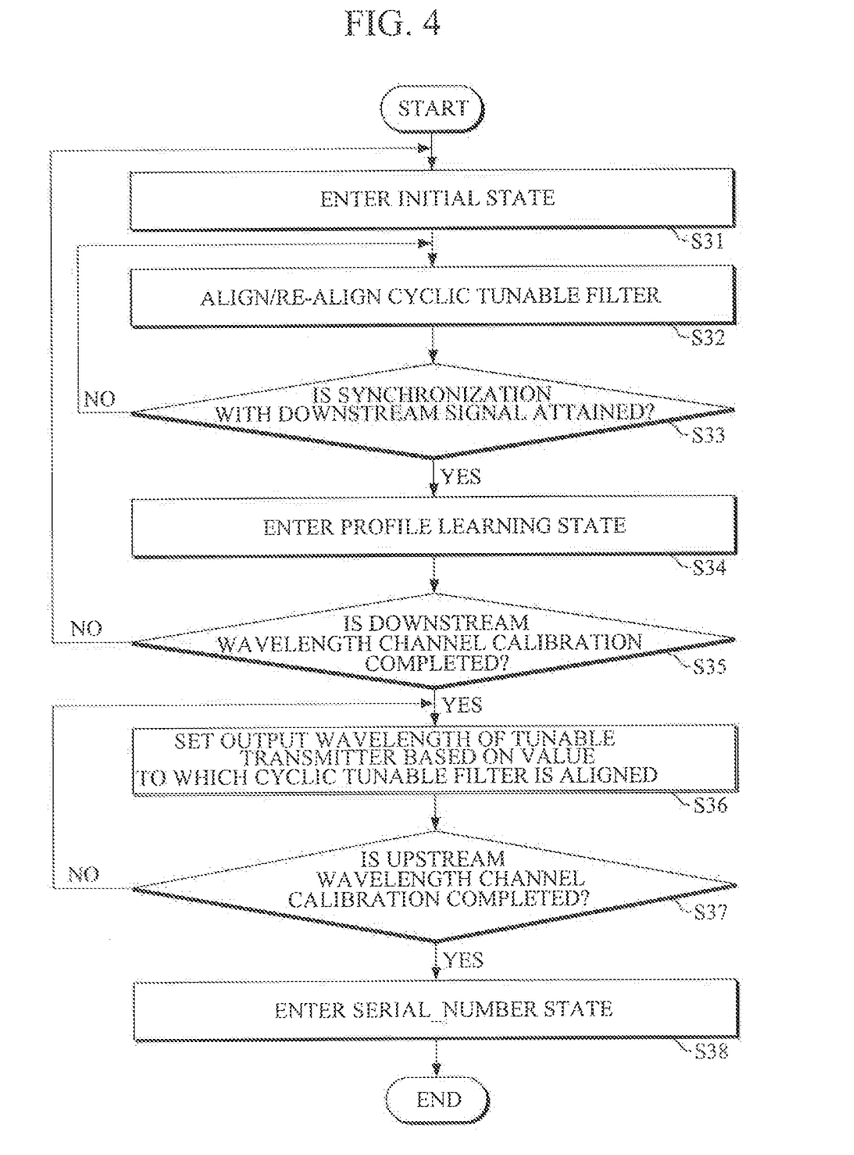
FIG. 4 is a flowchart illustrating an operating method of a tunable ONU according to an exemplary embodiment of the present invention.

FIG. 4 is a flowchart illustrating an operating method of a tunable ONU according to an exemplary embodiment of the present invention when the tunable ONU is connected to a network for the first time or when the tunable ONU is powered up for some reasons and enters the Initial state.

Referring to FIG. 4, the tunable ONU enters the Initial state as depicted in S31. The tunable ONU originally powers up in Initial state and can enter the Initial state in the course of downstream channel scanning and calibration. Alternatively, the tunable ONU may re-enter the Initial state during the operation, for example, upon ONU deactivation or being enabled after an emergency stop. In this state, the transmitter of the tunable ONU is generally turned off.

In S32, the tunable ONU in the Initial state aligns a cyclic tunable filter to a specific wavelength. By doing so, the tunable ONU can receive a downstream signal of a specific channel and attain synchronization to a downstream physical frame. The synchronization with the downstream physical frame may be performed upon initiating an ONU synchronization state machine that is specified in clause 10.1.2 of the draft.

In S33, it is determined whether or not the synchronization with the downstream physical frame, i.e., the downstream signal, is attained, based on the result of synchronization process. If the synchronization is not attained, the flowchart returns to S32 in which the cyclic tunable filter is re-aligned to a different wavelength and then it is determined whether the synchronization with the downstream signal has been attained.

In contrast, if it is determined in S33 that the synchronization is attained, the tunable ONU enters the Profile Learning state as depicted in S34. The ONU that has entered Profile Learning state learns the TWDM system and channel parameters from received Channel_Profile and TWDM_System_Announcement PLOAM message. Then, in S35, the tunable ONU determines whether downstream wavelength channel calibration has been completed. If it is determined in S35 that the calibration has not been completed, the tunable ONU continues to perform calibration, and, when failing to complete the calibration within a specific period of time, returns Initial state to repeat the operations following S31.

In contrast, if it is determined in S35 that the calibration has been completed, the tunable ONU turns the tunable transmitter on. Then, in S36, the tunable ONU sets the output wavelength of the tunable transmitter based on the value to which the cyclic tunable filter is aligned, as depicted in S32. According to the exemplary embodiment, since the tunable ONU includes the cyclic tunable filter that allows all wavelength channels of both a downstream signal and an upstream signal, once obtaining information about the wavelength channel of the downstream signal, the tunable ONU is able to easily learn information about the wavelength channel of the upstream signal.

According to one aspect of the present exemplary embodiment, the output wavelength of the tunable transmitter that is set in S36 may be identical to the wavelength of the upstream signal received by the upstream signal monitoring component (denoted as 24 in FIG. 3). Specifically, the upstream signal monitoring component obtains information about a wavelength of an upstream signal output through the cyclic tunable filter (denoted as 22 in FIG. 3), and the tunable ONU may set the wavelength of an upstream signal to the wavelength that passes through the cyclic tunable filter, as depicted in S36. Thus, according to the present exemplary embodiment, the tunable ONU does not need to communicate with an OLT in order to determine the output wavelength of the tunable transmitter (i.e. to perform upstream wavelength channel calibration). As a result, it is possible to reduce time taken by the tunable ONU to perform wavelength alignment, thereby allowing the tunable ONU to enter the operation state more quickly.

In addition, the tunable ONU determines whether the upstream wavelength channel calibration has been completed, as depicted in S37. If it is determined that the calibration has not been yet completed, the tunable ONU continues to perform the calibration, and, when failing to complete the calibration within a specific period of time, may repeat operation S36. For example, after having changed the output wavelength of the tunable transmitter according to a specific algorithm, the tunable ONU may re-determine whether the calibration has been completed. Alternatively, the upstream signal monitoring component may change the output wavelength of the tunable transmitted by using wavelength information about a received new upstream signal.

In contrast, if it is determined in S37 that the calibration has been completed, the tunable ONU enters the Serial_Number state, as depicted in S38. At this time, the tunable ONU may transmit a Tuning_Response (complete_u) PLOAM message as an upstream signal. Then, the tunable ONU performs an activation process (e.g., entering Ranging state and then transmitting and receiving the next specific signal, as specified in the aforesaid draft) and enters the operation state according to the existing method.

Figure 5:
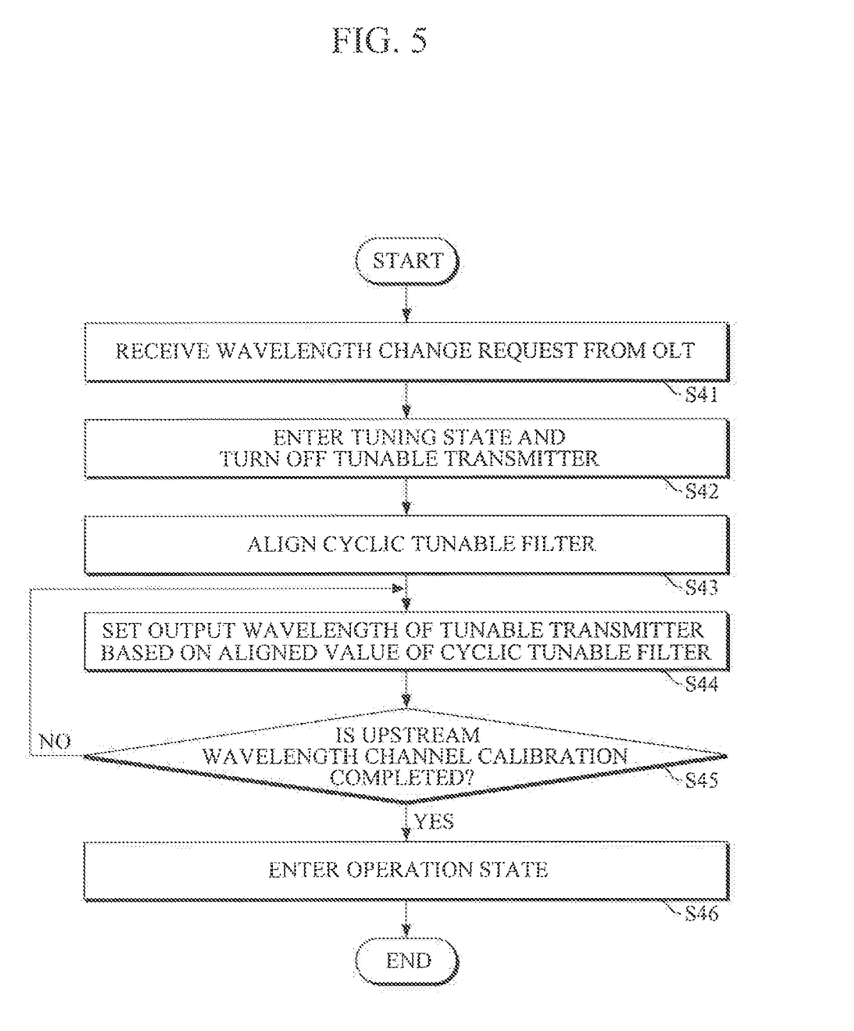
FIG. 5 is a flowchart illustrating an operating method of a tunable ONU according to another exemplary embodiment of the present invention.

FIG. 5 is a flowchart illustrating an operating method of a tunable ONU according to another exemplary embodiment of the present invention when the tunable ONU receives an instruction or request to change a wavelength from an OLT.

Referring to FIG. 5, the tunable ONU receives a wavelength change request from an OLT, as depicted in S41. The OLT may transmit the wavelength change request to the tunable ONU by sending a Tuning_Control(Request) signal. In response to receiving the wavelength change request, the tunable ONU enters the Tuning state and simultaneously turns off a tunable transmitter, as depicted in S42. The tunable ONU that has entered Tuning state aligns a cyclic tunable filter to a requested wavelength, as depicted in S43.

Once the wavelength alignment to the requested wavelength has been completed, the tunable ONU turns the tunable transmitter on. The tunable ONU sets an output wavelength of the tunable transmitter based on the aligned value of the cyclic tunable filter, as depicted in S44. In one exemplary embodiment of the present invention, since the tunable ONU includes the cyclic tunable filter that allows all wavelength channels of both a downstream signal and an upstream signal, once obtaining information about the wavelength channel of the downstream signal, the tunable ONU is able to easily learn information about the wavelength channel of the upstream signal.

In one aspect of the present exemplary embodiment, the output wavelength of the tunable transmitter that is set in S44 may be identical to the wavelength of the upstream signal received by the upstream signal monitoring component (denoted as 24 in FIG. 3). Specifically, the upstream signal monitoring component obtains information about a wavelength of an upstream signal output through the cyclic tunable filter (denoted as 22 in FIG. 3), and the tunable ONU may set the wavelength of an upstream signal to the wavelength that passes through the cyclic tunable filter, as depicted in S44. Thus, according to the present exemplary embodiment, the tunable ONU does not need to communicate with an OLT in order to determine the output wavelength of the tunable transmitter (i.e. to perform upstream wavelength channel calibration). As a result, it is possible to reduce time taken by the tunable ONU to perform wavelength alignment, thereby allowing the tunable ONU to enter the operation state more quickly.

Then, the tunable ONU determines whether or not upstream wavelength channel calibration has been completed, as depicted in S45. If it is determined that the calibration has not been yet completed, the tunable ONU continues to perform the calibration, and, when failing to complete the calibration within a specific period of time, may repeat operation S44. For example, after having changed the output wavelength of the tunable transmitter according to a specific algorithm, the tunable ONU may re-determine whether or not the calibration has been completed. Alternatively, the upstream signal monitoring component may change the output wavelength of the tunable transmitted by using wavelength information about a received new upstream signal.

In contrast, if it is determined in S45 that the calibration has been completed, the tunable ONU enters the Operation state, as depicted in S46. To enter the Operation state, the tunable ONU may transmit a Tuning_Response (complete_u) PLOAM message as an upstream signal and receive a complete_d PLOAM message as a downstream signal that is in response to the Tuning_Response (complete_u) PLOAM message.

Figure 6:
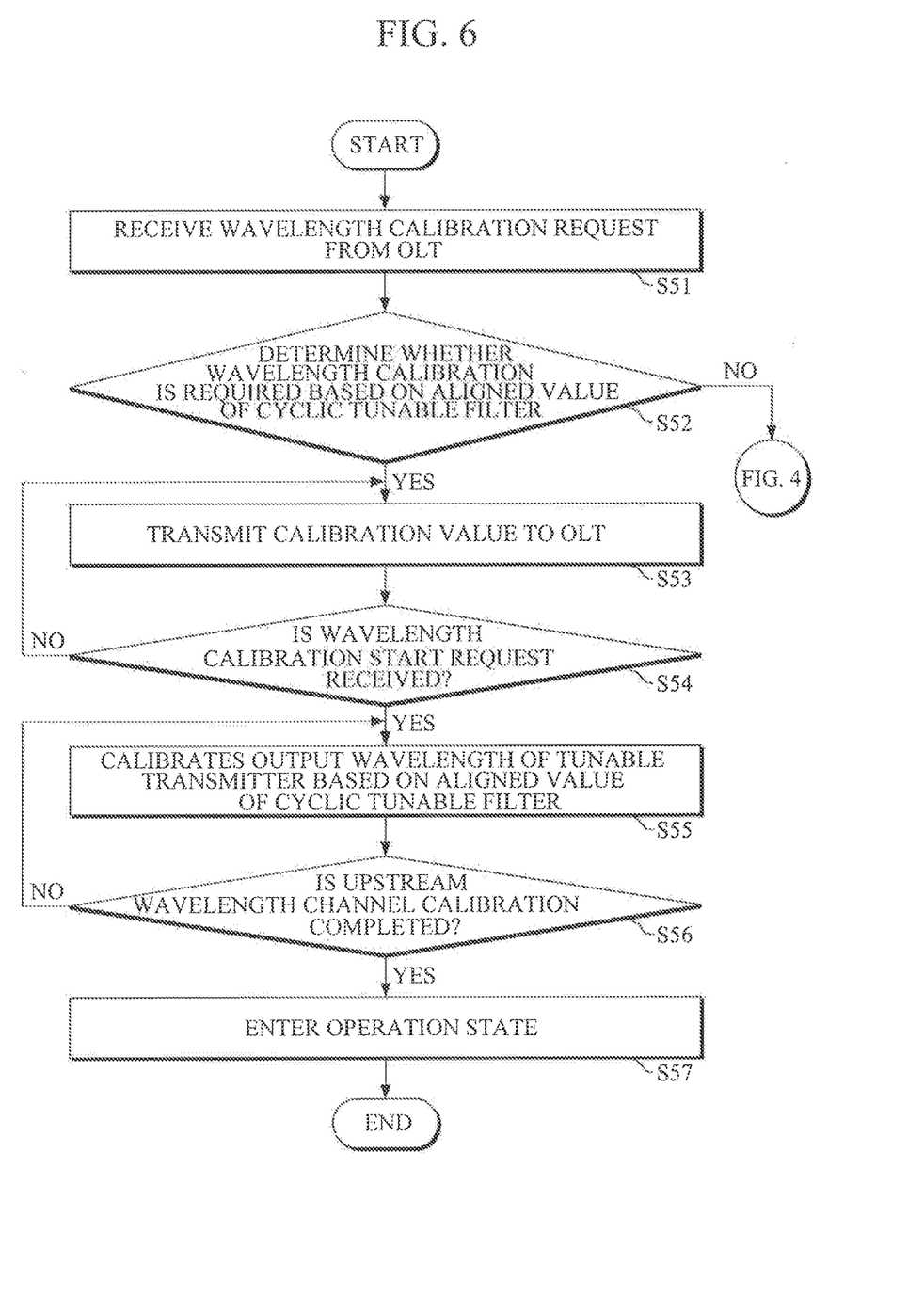
FIG. 6 is a flowchart illustrating an operating method of a tunable ONU according to another exemplary embodiment of the present invention.

FIG. 6 is a flowchart illustrating an operating method of a tunable ONU according to another exemplary embodiment of the present invention when the tunable ONU receives a wavelength calibration request from an OLT.

Referring to FIG. 6, the tunable ONU receives a wavelength calibration request from the OLT, as depicted in S51. The OLT may transmit the wavelength calibration request to the tunable ONU by sending a US_WLCH_INFO signal.

In response to receiving the wavelength calibration request, the tunable ONU determines, based on an aligned value of a cyclic tunable filter, whether wavelength calibration is required, as depicted in S52. For example, the tunable ONU may determine whether wavelength calibration is required based on a wavelength of an upstream signal received by the upstream signal monitoring component (denoted as 24 in FIG. 3). If it is determined in S52 that calibration is not required, the tunable ONU may re-enter the Initial state and perform again the activation process according to the aforementioned operating method.

In contrast, if it is determined in S52 that wavelength calibration is required, the tunable ONU transmits a calibration value to the OLT, as depicted in S53. The tunable ONU may transmit the calibration value to the OLT by sending a Serial_Number_ONU(calibration) signal. Then, in S54, the tunable ONU determines whether to have received a wavelength calibration start request. The OLT T may transmit the wavelength calibration start request to the tunable ONU by sending the US_WLCH_INFO signal. When failing to receive the wavelength calibration start request within the predetermined period of time, the tunable ONU may re-transmit the calibration value or, in some cases, a new calibration value to the OLT, as depicted in S53.

In contrast, if it is determined in S54 that the wavelength calibration start request has been received, the tunable ONU calibrates an output wavelength of the tunable transmitter based on the aligned value of cyclic tunable filter, as depicted in S55. The tunable ONU determines whether upstream wavelength channel calibration has been completed, as depicted in S56. If it is determined that the calibration has not been completed, the tunable ONU continues to perform calibration, and, when failing to complete the calibration within a specific period of time, returns the Initial state to repeat the operations following S55.

In contrast, if it is determined in S56 that the calibration has not been completed, the tunable ONU enters the operation state, as depicted in S57. To enter the Operation state, the tunable ONU may transmit a Tuning_Response (complete_u) PLOAM message as an upstream signal and receive a complete_d PLOAM message as a downstream signal that is in response to the Tuning_Response (complete_u) PLOAM message.

According to the exemplary embodiments as described above, it is possible to change or calibrate an output wavelength of the tunable transmitter of the tunable ONU without having to communicate with the OLT. Thus, time for wavelength alignment of an upstream signal and downstream signal of the tunable ONU is reduced, compared to the related art, and thereby quick wavelength alignment or calibration is possible. Further, in the case where the tunable ONU performs each procedure from the initial stage to a final stage of entering the operation state according to the activation process, the upstream signal wavelength channel can be promptly aligned, and thereby entire activation process can be completed quickly.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A tunable optical network unit (ONU) for a multi-wavelength passive optical network (MW PON) system, the tunable ONU comprising:
  a cyclic tunable filter configured to have cyclic wavelength transmission properties that allow all wavelength channels of both a downstream signal and an upstream signal and to vary a wavelength to pass therethrough;

a wavelength splitter configured to split an upstream signal wavelength band and a downstream signal wavelength band;

a photodetector element configured to detect a downstream signal that is transmitted through the wavelength splitter, passing through the cyclic tunable filter which is aligned to a specific downstream signal wavelength channel; and a tunable transmitter configured to output to the wavelength transmitter an upstream signal of a wavelength channel that is determined based on an aligned downstream signal wavelength channel of the cyclic tunable filter.

2. The tunable ONU of claim 1, wherein the cyclic tunable filter is a Fabry-Perot Etalon filter that is made of a material that varies its transmission properties according to temperature change or changes in applied voltage.

3. The tunable ONU of claim 1, wherein the cyclic tunable filter is a thermal arrayed waveguide grating (AWG).

4. The tunable ONU of claim 3, wherein the thermal AWG is made of silicon.

5. The tunable ONU of claim 1, further comprising:

an upstream signal monitoring component configured to monitor a wavelength of an upstream signal output through the cyclic tunable filter.

6. The tunable ONU of claim 5, wherein the upstream signal monitoring component comprises a tap filter to branch off a part of the upstream signal that has passed through the cyclic tunable filter and a monitoring photodiode to detect an upstream signal branched by the tap filter.

7. An operating method of a tunable ONU in an MW PON system, the operating method comprising:

receiving a downstream signal by aligning a cyclic tunable filter of the tunable ONU to a specific downstream signal wavelength channel;

setting an output wavelength of a tunable transmitter of the tunable ONU based on an aligned downstream signal wavelength channel of the cyclic tunable filter; and transmitting an upstream signal using the set output wavelength through the tunable transmitter.

8. The operating method of claim 7, being applied to operations of the tunable ONU to perform activation process in Initial state.

9. The operating method of claim 7, being applied to operations subsequent to an operation in which the tunable ONU under normal operation receives a request to change or calibrate an upstream signal wavelength channel.

* * * * *